US006794826B2

(12) United States Patent
Beasley (10) Patent No.: US 6,794,826 B2
(45) Date of Patent: Sep. 21, 2004

(54) APPARATUS AND METHOD FOR LAMP IGNITION CONTROL

(75) Inventor: Denny D. Beasley, Cincinnati, OH (US)

(73) Assignee: Delta Power Supply, Inc., Cincinnati, OH (US)

( * ) Notice: Subject to any disclaimer, the term of this patent is extended or adjusted under 35 U.S.C. 154(b) by 0 days.

(21) Appl. No.: 10/113,303

(22) Filed: Mar. 29, 2002

(65) Prior Publication Data
US 2003/0090215 A1 May 15, 2003

Related U.S. Application Data
(60) Provisional application No. 60/332,689, filed on Nov. 14, 2001.

(51) Int. Cl.[7] ............................................. H05B 37/02
(52) U.S. Cl. ........................ 315/224; 315/308; 315/360; 315/DIG. 5; 315/DIG. 7
(58) Field of Search ................................. 315/224, 276, 315/279, 283, 289–291, 307–308, 360, DIG. 2, DIG. 5, DIG. 7

(56) References Cited

U.S. PATENT DOCUMENTS

| | | | |
|---|---|---|---|
| 3,890,537 A | * 6/1975 | Park et al. ................... 315/208 |
| 4,048,539 A |   9/1977 | Walker et al. ............... 315/176 |
| 4,396,872 A | * 8/1983 | Nutter ......................... 315/308 |
| 4,572,988 A |   2/1986 | Handler et al. .......... 315/209 R |
| 4,999,547 A | * 3/1991 | Ottenstein ................... 315/307 |
| 5,103,139 A | * 4/1992 | Nilssen ........................ 315/219 |
| 5,652,481 A | * 7/1997 | Johnson et al. ............. 315/308 |
| 5,757,145 A | * 5/1998 | Johnson et al. ............. 315/308 |
| 5,883,475 A |   3/1999 | Beasley ....................... 315/307 |
| 5,914,571 A |   6/1999 | Beasley ....................... 315/244 |
| 6,008,586 A |  12/1999 | Norman ........................ 315/94 |
| 6,160,362 A |  12/2000 | Shone et al. ................ 315/308 |
| 6,208,088 B1 |  3/2001 | Konishi et al. ............. 315/291 |
| 6,236,168 B1 |  5/2001 | Moisin ........................ 315/291 |
| 6,259,215 B1 |  7/2001 | Roman ........................ 315/307 |
| 6,300,725 B1 | 10/2001 | Zinkler et al. .............. 315/291 |
| 6,353,294 B1 | * 3/2002 | Wammes et al. ........... 315/246 |
| 6,498,439 B2 | * 12/2002 | Van Den Nieuwenhuizen et al. .......................... 315/290 |

* cited by examiner

Primary Examiner—Thuy Vinh Tran
(74) Attorney, Agent, or Firm—Wood, Herron & Evans, L.L.P.

(57) ABSTRACT

Intermittent electrical power is applied to a lamp ballast to achieve reliable ignition within specifications of the related hardware. The operating state of the lamp is sensed to facilitate application of the power during lamp ignition. Control circuitry associated with a ballast is operable to interrupt the ionizing potential once prior to the lamp's reaching an igniting state. That is, an ignition cycle associated with the ionizing potential may be intermittent, having an interruption, or "off" period. For example, a ten-second ignition cycle may include a one-second "on" period, followed by nine-seconds of no ionizing potential. The ignition sequence and associated intermittent ionizing potential supply will repeat as necessary to achieve lamp ignition. The intermittent nature of the ballast output enables the lamp to achieve an ignited state in manner that obviates the need for large, damaging voltage spikes. This feature mitigates loss of material from electrodes, the occurrence of tube blackening and the shortening of lamp life. Consequently, the efficiency of the lamp is improved over time, and lamp operation requires less applied power. Timing protocol of the invention additionally ensures compatibility with conventional RMS and other equipment ratings, reducing requirements for high voltage wiring and sockets.

31 Claims, 2 Drawing Sheets

APPARATUS AND METHOD FOR LAMP IGNITION CONTROL

PRIORITY

Applicant claims the benefit of the filing date, Nov. 14, 2001, of applicant's provisional application, Serial No. 60/332,689, entitled Lamp Ignition, the contents of which are incorporated herein by reference.

FIELD OF THE INVENTION

The present invention relates generally to high intensity discharge lamps, and more particularly, to ballast circuitry for igniting the same.

BACKGROUND OF THE INVENTION

Efficiency, compatibility and longevity considerations have become ubiquitous within the artificial lighting industry and consumer base. To this end, manufacturers of incandescent, fluorescent and high-intensity (HID) light sources allocate substantial resources to improve operation of their mercury vapor, metal halide, high pressure sodium and low pressure sodium lamps. The relatively low power consumption and light color features associated with such sources have made HID lighting systems commonplace in factories, schools, retail stores, industrial buildings, studios, and malls and street settings.

Unlike conventional incandescent lamps that may be powered directly from a 120V/60 Hz utility source, HID lamps typically require a ballast for the ignition and subsequent operation of the lamp. Ballast circuitry regulates the flow of electrical current to a lamp in order to facilitate coordinated ignition and subsequent operation. In addition to various resistive and inductive components, circuitry associated with the ballast may include a transformer to provide a voltage to the lamp along with an ignition component configured to accelerate the state of the lamp to an ignited state. That is, a state exhibiting intense luminous output formed by the passage of electric current across a space between electrodes.

The ignited, or thermionic arc state of a lamp is typically preceded by two stages of operation that may be categorized as initial Ionization followed by glow discharge. During the ionization phase, a ballast supplies a continuous high voltage across the electrodes of the lamp. Once sufficient voltage is attained to achieve initial ionization the lamp enters the glow discharge stage. Glow discharge is a transitory stage continuing until the electrodes achieve thermionic emission. Ideally, the lamp transitions out of glow phase to the ignited state, and the ballast then reduces lamp voltage and increases lamp current. Thereafter, current is regulated and the lamp operates under steady state conditions.

Due to differing voltage requirements associated with the progressive stages of ignition, it is advantageous for the ballast circuitry to provide varying voltage protocols tailored to respective stages. For example, electrodes are cold in non-thermionic emission, prior to ignition. Consequently, a sufficiently strong electric field must be provided to lift electrons off of the surface of the electrodes. As such, conventional applications apply a very high voltage narrow spike embedded in a continuous waveform to ionize gas. In this manner, the energy conveyed in the narrow spike is proportional to the material that is ionized. In other word, the HID lamps go through several stages while being turned on, and as they reach their steady or ignited state of luminescence. At least one of these stages requires an application of high voltage in a narrow voltage spike that has several inherent disadvantages.

Despite the efficiencies and aesthetic advantages inherent to HID lamps, problems associated with ignition sequences may substantially degrade the performance and life expectancy of the lamp. Cold conditions of the electrodes at startup make them especially vulnerable to degradation from the high, spiking voltages of conventional applications, which routinely exceed five kilovolts in magnitude. Additionally, the hard spike of initial ionization stage and sporadic electron flow associated with glow discharge precipitates the occurrence of electrode sputtering.

Sputtering produces volatile particulate scattering of electrode surface material, such as tungsten. Over time, the tungsten may condense on and blacken the inner surface of the lamp. Transmission of light through the envelope decreases as the interior of the lamp blackens. Tungsten pieces may additionally absorb radiation and increase the temperature of the lamp casing to a critical level. This increased heat may decrease lamp life while requiring more power.

Thus, while the amount of energy in the voltage spike is proportional to the number of electrons excited, voltage levels additionally relate directly to the amount of damage sustained in the arc tube of HID lamps. That is, while the sudden and irregular nature of the voltage spike effectively excites electrons off of the electrodes, it also lifts neutral matter off of the electrodes resulting in darkening or blackening around the electrode. In this manner, material from the electrode is destroyed every time a high voltage pulse is applied to the electrode. Over time, the opacity of the arc tube will also increase to further frustrate lighting operation.

Another obstacle confronting conventional ignition applications concerns equipment ratings. For instance, the root-mean-square (RMS) value of wiring and sockets may prescribe a maximum voltage level and associated duration that the respective equipment can convey without incurring damage. An exemplary rating may, for instance, correspond to 5,000 kilovolts for one second. Exceeding those parameters can damage hardware and interrupt operations. While the spiking nature of prior art signals are typically short enough in duration to avoid violating such parameters, the magnitude of the associated voltage can still have severe effects on the electrodes, including the above discussed sputtering phenomena.

Consequently, some lighting manufacturers attempt to decrease the occurrence of spiking extremes by formatting or otherwise altering the waveform shapes associated with the power supplied to the lamp to achieve ignition. For instance, sinusoidal waveforms used in most applications may be supplanted with continuous square waves of longer duration and lower voltage levels. While such attempts demonstrate success in achieving a somewhat more controlled ignition, the large aggregate ionizing potentials associated with such voltage applications require special hardware, such as wires and sockets having unconventionally high power and RMS ratings. Such special requirements pose additional cost and compatibility obstacles to manufacturers. Furthermore, the continuous waves still accommodate extended periods of glow discharge phase and detrimental effect associated, therewith.

Consequently, what is needed is a manner of igniting a ballast and associated lamp without degrading the performance and overall life of the same. Further, such a method will ideally account for manufacturer specifications of hardware typically associated with HID lamps.

SUMMARY OF THE INVENTION

The invention addresses these and other problems associated with the prior art by providing an improved apparatus and method for operating a ballast to energize a lamp to an ignited state. Control circuitry associated with the ballast is operable to interrupt the ionizing potential once prior to the lamp's reaching an ignited state. That is, an ignition cycle associated with the ionizing potential may be intermittent, having an interruption, or "off" period. For example, in one of numerous embodiments according to the invention, in a plurality of possibilities, a ten second ignition cycle will preferably include a one second "on" period, followed by nine seconds of no ionizing potential. The ignition sequence and associated intermittent ionizing potential supply will repeat as necessary to achieve lamp ignition.

The intermittent nature of the ballast output enables a lamp to achieve an ignited state in a manner that obviates the need for the large, damaging voltage spike of the prior art. This feature mitigates loss of material from electrodes, the occurrence of tube blackening and the shortening of lamp life. Consequently, the efficiency of the lamp is improved over time, and lamp operation requires less applied power. Timing protocol of the invention additionally ensures compatibility with conventional RMS and other equipment ratings, reducing requirements for high-voltage wiring and sockets.

The invention further provides a mechanism for sensing various states of the lamp at its stages of ignition. For instance, a sensor may detect a voltage, current, radiated energy or some optical occurrence indicating the state of the lamp. In response to such detection, the control circuitry inhibits the cycling circuitry if the lamp has reached its ignited state or may repeat ionization cycles if it has not. As a result, the lamp transitions from ignition to normal steady state operation in a manner that minimizes tube blackening while maximizing lamp efficiency and longevity.

The above and other objects and advantages of the present invention shall be made apparent from the accompanying drawings and the following description.

BRIEF DESCRIPTION OF THE DRAWING

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF DRAWINGS

Figure 1:
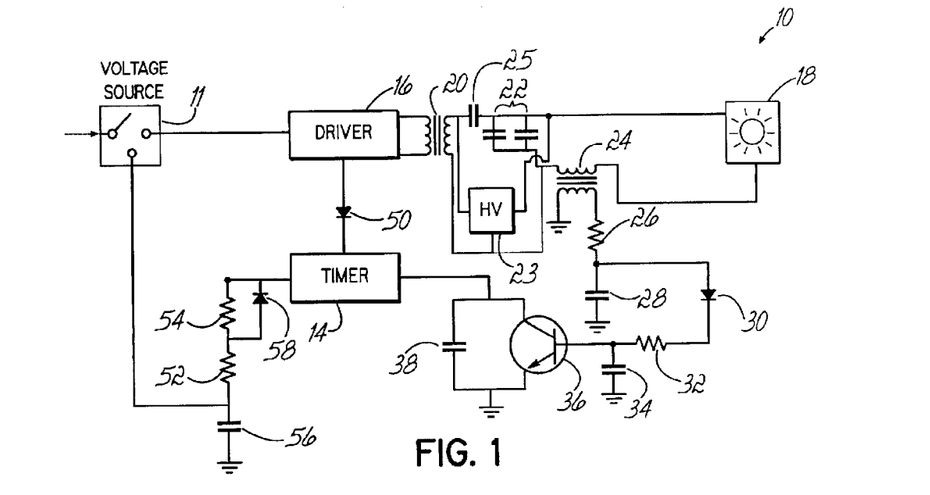
FIG. 1 shows a first apparatus in accordance with the principles of the present invention.

With reference generally to the Drawings, FIG. 1 shows an apparatus 10 suited to energize and ignite a lamp 18 in a manner consistent with the principles of the present invention. The apparatus 10 relies in part upon timer and driver circuitry 14, 16 to apply intermittent electrical energy to the lamp 18. Prior to the lamp achieving an ignited state, the intermittent ionizing potential generated by the driver 16 and supplied to the lamp 18 may exhibit interruptions if the lamp does not ignite on the first attempt. To this end, the ionizing potential has at least one ionization cycle associated with it. The ionization cycle, in turn, has a specified time duration characterized by at least one "on," or high voltage portion, and one "off" portion, the duration of which where no energy is available to the lamp.

The intermittent nature of the power may obviate the need for applying a large voltage spike to a lamp as associated with many of the problems plaguing prior art applications. Such provision further allows for more controlled and smooth ignition applications, mitigating the loss of material from electrodes, the occurrence of tube blackening and the shortening of lamp 18 life. As discussed herein, protocol executed by the timer 14 may additionally ensure compatibility with conventional RMS voltage ratings, mitigating requirements for high-voltage wiring and sockets.

Turning more particularly to FIG. 1, high voltage generator 23 steps-up voltage generated by the driver 16 and transformer 20. Of note, the power to the driver may originally be provided via a suitable constant voltage source 11. Capacitors 22, 25 ferry the resultant signal to the lamp 18 in order to energize electrodes contained within the same. A more thorough explanation regarding the function of the capacitors 22, 25 is available through a reading of U.S. Pat. No. 5,914,571, which is hereby incorporated in its entirety by reference. Of note, any number of resistive, inductive or other components may be incorporated into a load delivery circuit/apparatus 10 as required by steady state protocol and as may be appreciated by one skilled in the art.

One embodiment consistent with the principles of the present invention may further position a load or other sensor in series with the circuit path. For instance, FIG. 1 shows a current transformer 24 positioned in series with capacitors 22, 25 to generate a current that is proportional to the signal simultaneously supplied to the lamp 18. More particularly, the current transformer 24 may sense and react to current at the lamp 18 by generating a voltage in response. That current may then be bandpass limited by resistor 26 and capacitor 28. As such, the resistor 26 and capacitor 28 act in tandem to eliminate high frequency elements of the lamp current that are not indicative of the lamp's operational status. A diode 30 may further rectify the bandpass limited output prior to the signal being further limited and filtered by resistor 32 and capacitor 34, respectively.

In this manner, resistive, capacitive and transformer components process the signal in preparation for application to a bipolar transistor 36. Though manipulated as such, the signal remains proportional, and thus indicative of the current drawn by the lamp 18. In such a state, the signal arrives at a gate of the bipolar transistor 36. The apparatus 10 of FIG. 1 capitalizes on physical characteristics of the transistor 36 to determine whether the lamp 18 draws current. More particularly, the properties of the transistor 36 may be exploited to generate an inhibit signal indicative of the operational state of a lighting application.

Namely, the transistor 36 may function to alter current flow and disable certain timed ignition sequences whenever the load at the lamp 18 exceeds a preset level. This preset level may correlate to a voltage produced by the current transformer 14 when the lamp 18 has achieved a state of ignition. Preferably, the bipolar transistor 36 has an associated threshold value near or at the preset voltage level. One embodiment may slightly increase the value of the threshold setting relative to the preset voltage level for hysteresis considerations. Though discussed below in greater detail, one such goal of the hysteresis may include ensuring that the ignition sequence transitions safely beyond the glow discharge state.

Thus, the transistor 36 saturates whenever voltage applied to its base matches or exceeds the threshold value/preset voltage level. In a preferred embodiment, the associated threshold value may be set at around 0.6 volts. In such an application, the current transformer 24 may generate a signal conveying 0.6 volts in response to sensing an amount of current drawn by the lamp 18 that corresponds to the ignited state or otherwise approaches the preset voltage level. In this manner, the threshold value of the transistor 36 is tuned to react to the lamp 18 achieving an ignited state. As discussed below, the transistor 36 may respond to such a state by disabling a timer 14 circuit associated with ignition sequences.

Prior to ignition, however, the bipolar transistor 36 is open so long as the applied voltage remains below that of the threshold potential. More particularly, while the voltage presented at the base of the transistor 36 fails to rise to the preset level, the transistor 36 remains in an off state and allows current to flow in such a manner as to enable the capacitor 38 to accumulate potential. The capacitor 38, in turn, periodically discharges current into and thus enables the timer 14 as the voltage rises across lamp 18. During normal ignition sequences, a port 13 of the timer 14 charges the capacitor 38 from about one third to two thirds of its voltage capacity.

Thus, the timer 14 remains enabled so long as the voltage at the gate of the bipolar transistor 36 remains at a level below the associated threshold voltage. The timer functions in part to control the operation of the voltage source 11 and/or driver 16. As discussed above, the driver 16 initiates the current that the transformer 20 steps up to energize the lamp 18.

Figure 2A:
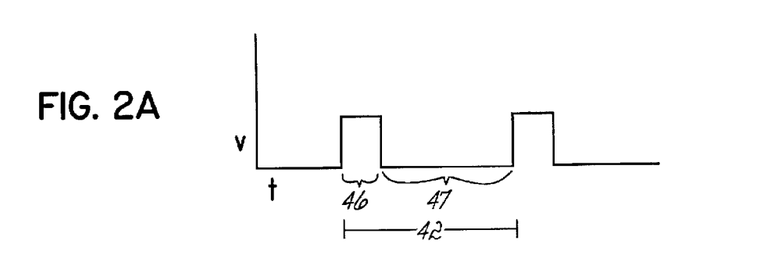
FIGS. 2A–C illustrate characteristics of exemplary ionizing potential that may be generated by the apparatus of FIG. 1.

The timer 14 of FIG. 1 addresses such conventional shortcomings by introducing an interruption into the ionizing potential delivered by the driver. Of note, a timer 14 consistent with the principles of the present invention may include any clock or signal processing device suited to regulate or otherwise manipulate the output produced by the driver 16. The exemplary cycle 42 shown in FIG. 2A includes a square wave function. Of note, other embodiments consistent with the principles of the present invention may include any waveform or even multiple, superimposed waveforms. Thus, while the cycle 42 illustrated in FIG. 2A is shown as a square wave, another embodiment may superimpose higher order harmonic waves onto the cycle 42. In any case and as shown in FIG. 2A, the cycle 42 includes both on and off components 46, 47.

The intermittent nature of the exemplary cycle 42 of FIG. 2A contrasts the continuous characteristics of prior art signals. During an ignition application, the timer 14 of FIG. 1 initiates such off periods 47 as shown in FIG. 2A to facilitate an ionization cycle 42. The cycle 42 of FIG. 2A preferably includes one second of applied potential, followed by nine seconds where no ionizing potential is applied to the associated HID lamp.

Figure 2B:
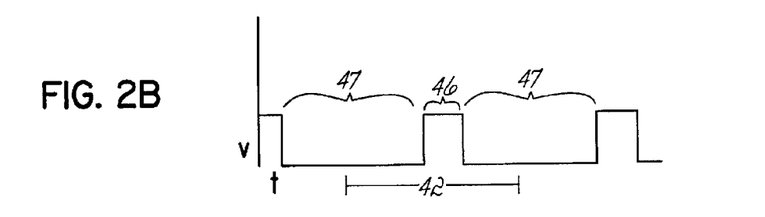
Figure 2C:
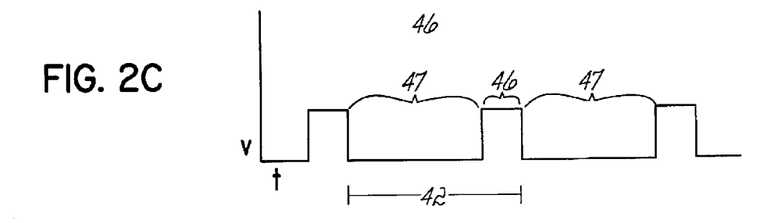

While such a protocol may prove advantageous for some ignition applications, one skilled in the art can appreciate that the placement of the off period(s) 47 may be varied such that an interruption in ionizing potential occurs near the middle or end of a cycle 42 as shown in FIGS. 2B and C, respectively. Furthermore and as discussed below, a given cycle 42 may include multiple off and on periods 47, 46, and waveform characteristics may vary as between on periods 46 of the same or contiguous cycles of the ionizing potential.

In this manner, the embodiment allows the ionization, or "on" portion 46 of the ionizing potential to be sculpted according to an optimum voltage level that remains unassociated with the damaging effects of high voltage of conventional signals. That is, the off period 47 of a given ionization cycle 42 brings down the aggregate voltage associated with the entire cycle to a level that conforms with required RMS ratings. As such, the voltage and duration of the sculpted wave 42 may nonetheless be set at a level that excites a maximum number of electrons of an electrode without causing the detrimental effects associated with prior art applications.

Particularly, the off period 47 shown in FIG. 2A facilitates such control while additionally ensuring compatibility with RMS and other equipment specifications. Namely, the capacitive and resistive components of apparatus 10 of FIG. 1 may specifically incorporated to account for a RMS rating required for a particular lighting environment. The timer 14 of apparatus 10 may determine the on and off periods 46, 47 of the cycle 42 of FIG. 2A according to the following RMS/V equation:

$$V_{eff}^2 = 1/T \int f(V)^2 - 0 \, \partial t.$$

As such, the effective value or RMS parameter equates to the square root of the mean value squared over the period (ideally 10 seconds), or:

$$V_{eff} = sqrt \, [\frac{1}{10}(V_{on}^2 + V_{off}^2)].$$

Since $V_{off}$ is always zero, the apparatus 10 of FIG. 1 may accommodate specified RMS parameters by ensuring the voltage associated with the on portion of the ionizing potential complies with the above equation. That is, the off portion of the ionizing potential lowers the effective voltage of a cycle such that the duration of the ON portion may be increased without violating the RMS rating. The increased duration of the on portion translates into greater excitation of electrons. Conspicuously and advantageously absent are the high voltage spiking characteristics associated with conventional ignition signals that may have a duration of only a few microseconds. As such, an industry standard lamp having a rating of about 35 Watts to about 1500 Watts may be energized to an ignited state with a 99% probability by applying an ionizing potential that has a peak voltage level that does not exceed about 2.5 kilovolts in magnitude. Put another way, such ignition could be achieved with three-sigma ignition, sigma being a statistical variable for a certain population density of lamps. As such, one sigma could represent about 33%, two sigma 66%, and three sigma 99% as prescribed by this standard statistical descriptor.

In this manner, the dimensions of applied voltage wave 44 of FIG. 2A may be limited only by particular duration and voltage specifications associated with the hardware. For instance, a wire or socket having a 1.5 kilovolt and one second rating maybe accommodated by apparatus 10 of FIG. 1 so long as the on component 44 of a cycle 42 of FIG. 2A does not exceed one second and convey a peak ionizing potential of more than 1,500 volts. Applying these values to the above equation reveals the following effective voltage:

$$RMS/V_{eff} = sqrt \, [\frac{1}{10}(1500^2 + 0)] = 474 \text{ volts}.$$

While such voltage remains safely under the 600 volt RMS rating of most standard equipment, it nonetheless suffices to achieve a more controlled ignition sequence due to the extended duration of the square waveform. Thus, the apparatus 10 accomplishes a less damaging ionization cycle without violating equipment parameters. Implementation of the above calculations and associated functions may be accomplished via hardware circuitry as shown in apparatus 10. For instance, the value of capacitor 38 of FIG. 1 may be manipulated to effect the protocol of the timer. However, one skilled in the art will appreciate that similar functionality can be realized digitally using software, a microprocessor, or other controller.

When enabled during an ignition phase, the timer 14 of FIG. 1 relates the intermittent power described above to the driver 16. The driver 16 may be configured to receive only a low input signal from the timer 14 via a series connected diode 50. As such, the low signal from the timer 14 may embody an inhibit signal that interrupts ionization transmissions from the driver 16. The frequency of the inhibit signals and corresponding ionization interruptions will track the off period 47 of the intermittent ionization cycles shown in FIG. 2A. By way of reminder, the timer 14 of FIG. 1 will initiate inhibit signals and cycles during pre-ignition phases where the lamp fails to draw adequate current to constitute ignition and saturate the bipolar transistor 36. Once the ignited phase is achieved, the timer 14 will no longer transmit the inhibit signal to the driver absent an interruption of the load circuit.

As discussed above, the apparatus 10 of FIG. 1 may use the bipolar transistor 36 to ascertain at what instant a lighting application enters the ignited state. Specifically, should the base voltage delivered to the transistor 36 achieve a level that corresponds to a voltage greater than the associated threshold voltage, then the transistor 36 will saturate and become active. Thus, a high current draw from the lamp 18 will effectively enable the transistor 36. In a saturated state, the transistor 36 holds a capacitor 38 at a ground state. That is, the capacitor 38, which drives the timer cycles as discussed above, retains no charge. An absence of potential across the capacitor, in turn, causes the operation of the timer 14 to cease.

In this manner, the transistor 36 acts to recognize the operational status of the lighting application according to current drawn by the lamp 18. This feature is enabled by the correlation between the load drawn by the lamp 18 at ignition and the threshold value of the transistor 36. Namely, when the current drawn by the lamp 18 reaches the prerequisite current level, the saturated transistor 36 inhibits both the timer 14 and its associated, intermittent ionization cycles. Once in the ignited phase, ballast circuitry may provide ionizing potential to the lamp 18 as accomplished in the prior art. Ignition having been thus accomplished, the ignition sequences and processes associated with the timer 14 are not required until operation is interrupted. In response to such an interruption, the apparatus 10 senses the lack of current drawn by the lamp 18 and disables the bipolar transistor 36. This sequence re-engages the timer 14 until the intermittent ionization cycles once again realize ignition.

Of note, while the apparatus 10 of FIG. 1 uses a current transformer 24 in conjunction with a bipolar transistor 36 to recognize the ignited state of a lighting application, another embodiment may alternatively employ photosensing equipment positioned near the lamp 18. As such, the photosensing equipment may detect when the light radiating from lamp 18 exceeds, for instance, 10% of the lamp's 18 illumination capacity.

Still another embodiment may replace the current transformer 24, bipolar transistor 36 and associated circuitry with an electromagnetic sensor or other antenna device configured to detect radiated energies from the lamp 18. To this end, one skilled in the art will appreciate that any device or method known to quantify any chemical, optical, thermal or performance characteristic of a light source has application within the scope of the present invention. Furthermore, any such device may readily be augmented with known microprocessor and other control circuitry to realize still other performance advantages.

An ancillary function of the timer 14 and its associated cycles accounts for manufacturer "lockout" specifications. Lockout concerns a hardware stipulation that requires that power supplied to the lamp 18 be held at maximum for some manufacturer-specified duration before power to the lamp 18 is reduced, such as may occur during a dimming operation. One embodiment of the present invention shown in FIG. 1 incorporates a second resistor/capacitor timing circuit against the advent of such a power reduction to the high intensity discharge lamp 18. Namely, resistors 52 and 54 of FIG. 1 work in tandem with charging capacitor 56 to produce a threshold mitigated time delay from an output of timer 14.

When the ionizing potential from the driver 16 is inhibited by the timer 14, capacitor 56 charges momentarily through resistors 52 and 54. As such, the diode 58 effectively bypasses the relatively larger resistor 54, limiting the discharge time and maximum current during reset of the timing cycle. This secondary timing circuit ensures that the requisite power level is maintained to ensure that power reduction sequences are locked-out in accordance with manufacturer specifications.

Figure 3:
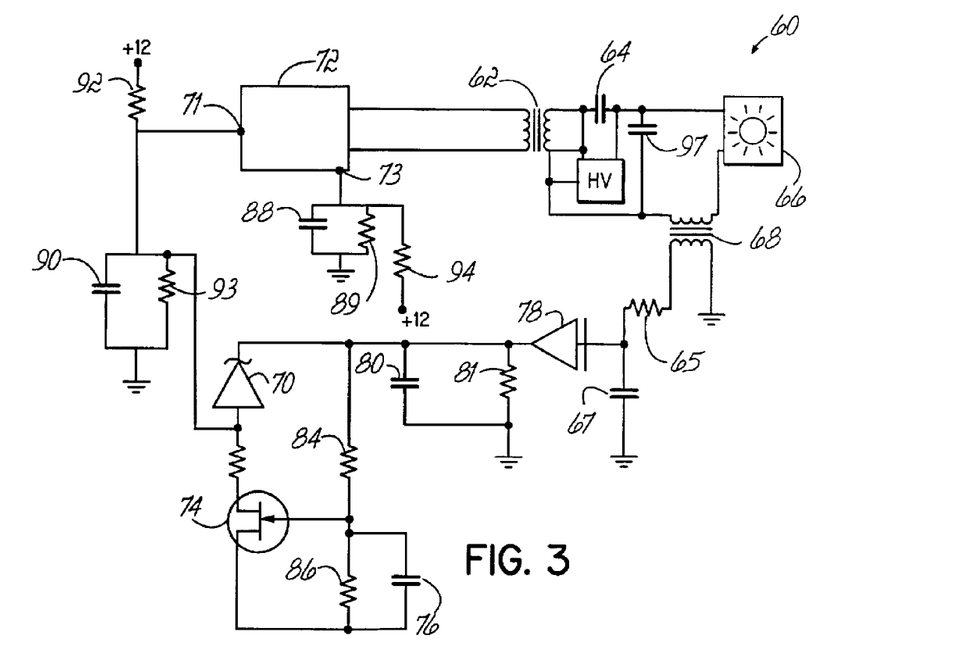
FIG. 3 shows a second apparatus in accordance with the principles of the present invention.

As may be appreciated by one skilled in the art, the function of the timer 14 of FIG. 1 maybe integrated with that of driver 16. Apparatus 60 of FIG. 3 exhibits such a configuration. As shown in FIG. 3, transformer 62 directs and filters power through capacitor 64 to an HID lamp 66. A controller 72, which has integrated driver, timing and other signal processing circuitry generates and intermittently conveys power to the transformer 62. A current transformer 68, or other suitable current, load, radiation or optical sensing device provides a proportional output at its secondary terminals. A resistor 65 and capacitor 67 work in conjunction to bandpass filter the proportional output from the current transformer 68. The sampled output is then applied to diode 78 for rectification and is further subjected to capacitor 80 for filtration.

The resultant signal is then applied to a gate of a field effect transistor (FET) 74. Preferably, the gate threshold of the FET 74 is around 2-3 volts. A resistor divider pair 84, 86 determines when the gate threshold of the FET 74 is achieved. That is, current flowing through the resistors 84, 86 will generate voltage applied against the gate of the FET 74. When current and associated voltage at the gate of transistor 74 is sufficiently high, the transistor 74 saturates and holds capacitor 90 at ground state. As such, the FET 74 prohibits the capacitor 90 from presenting a voltage at input pin 71 of the controller 72. Pin 71 of the controller 72 functions to enable the timing cycles in response to the voltage level of capacitor 90. As discussed herein, those timing cycles cause the ionizing potential to exhibit interruptions within a given ignition cycle. Thus, the FET 74 and resistors 84, 86 comprise threshold triggered sensing for enabling and curtailing timer cycles and associated ignition sequences.

Conversely, the FET 74 remains off when the current at the lamp 66 is too low to cause the current transformer 68 to produce a voltage through a divider comprised of resistors 84 and 86 that equals that of the FET's 74 gate threshold voltage. In an unsaturated state, FET 74 is effectively an open circuit thus allowing capacitor 90 to charge through resistor 92. Simultaneously, capacitor 88 charges through resistor 94. In this manner, the capacitor pair 88, 90 controls the timing cycles inherent to the driver 72. That is, when capacitor 90 achieves the threshold of pin 71 of the controller 72, the controller 72 pauses the transmission of the power to the transformer 62. This pause constitutes an "off" period of the ionizing potential.

Capacitor 88 charges to a second threshold connected to pin 73 of the controller 72 to initiate an "on" component 46 of a signal as shown in FIG. 2B. To accomplish the preferred nine to one ratio of the ionization cycle, capacitor 90 will charge at one-tenth of the rate of capacitor 88. For operational considerations, the second pin 73 of the controller 72 may be associated with a programmable priority overriding input to the first pin 71. Thus, the output signal from the controller 72 to the transformer 62 is immediately responsive to load requirements.

In this manner, the ionizing potential generated by the controller 72 may exhibit intermittent characteristics as described in the text accompanying FIGS. 2A-C. That is, controller 72 ceases to provide power to transformer 62 and lamp 66 for a period of nine seconds, followed by a one second ionization application. The timing cycle will then repeat as above until the voltage threshold of the FET 74 is achieved, meaning that the lamp 66 has reached an ignited state. As discussed herein, such a state is accompanied by saturation of the FET 74 and a subsequent inhibition of the timing cycle/ignition sequence.

Of note, the apparatus 60 of FIG. 3 provides for some measure of overload protection in the form of zener diode 70. Zener diode 70 may act as a voltage source in response to the sampled and filtered signal from capacitor 80 exceeding a zener voltage level associated with the diode 70. As a voltage source, the activated zener diode 70 may initiate a timing cycle should the output exceed the zener voltage plus an incremental voltage. The incremental voltage, preferably one volt in magnitude, is provided by the controller 72.

This characteristic of the zener diode 70 provides overload protection in that it will disable driver output from 72 into the transformer 62 for a period. More particularly, an "off" component of the timing cycle initiated by the active zener diode 70 stops power output to the lamp 66 for a preset duration, such as the exemplary nine second period of FIG. 2A. While the simplicity of the zener diode 70 configuration lends particular application to the above discussed embodiment, one skilled in the art will appreciate that it could be replaced with a comparator network or other hardware and/or digital software mechanism configured to achieve similar overload functionality.

Figure 4:
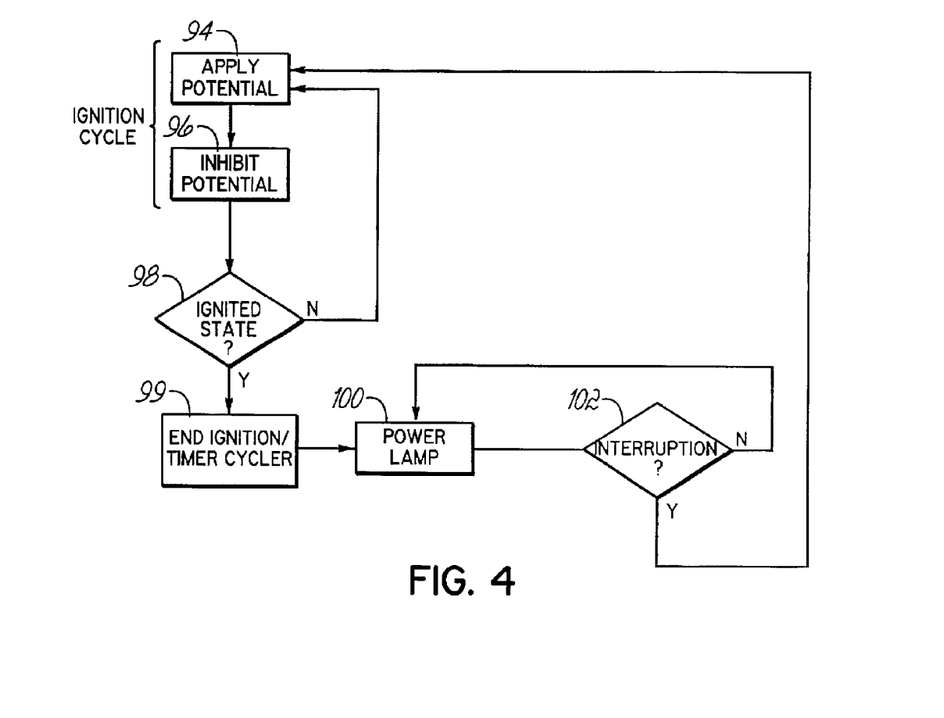
FIG. 4 illustrates a flowchart having sequenced steps suitable for execution by the apparatuses of FIGS. 1 and 3.

The flowchart of FIG. 4 illustrates sequence of steps suitable for implementation within the hardware environments of FIGS. 1 and 3. Generally, the steps demonstrate a method for igniting a ballast using intermittent ionizing potential. Such power is initially applied via a transformer and associated circuitry to a HID lamp ballast at block 94 of FIG. 4. The duration and magnitude of the ionizing potential are predetermined according to desired ionization requirements and equipment specifications. For instance, the aggregate ionizing potential delivered may be sufficient to ignite the lamp while obviating any requirement for high voltage wires and sockets.

In a preferred embodiment, the duration of the ionization portion is limited to one second. The remaining portion of a ionization cycle preferably includes a nine second period where the power is inhibited at block 96. That is, no ionizing potential is applied to the lamp following the initial applied power. At the conclusion of the inhibit cycle at block 98, the embodiment may assess the status of the load. For instance, a current transformer may sample the current drawn by the HID lamp at block 98. Alternatively or in addition, a photosensor or radiation detector may sample respective parameters to determine the status or stage of the load. Should an insufficient amount of current or radiation be detected at block 98 to indicate that the ballast has achieve an ignited state, then the timer cycle will repeat at block 94. That is, another controlled, one second ionizing potential will excite electrons of the lamp at block 94, followed by a period of no ionizing potential at block 96.

Conversely, should the ignited state be detected at block 98, then the timer and associated ignition cycles will be inhibited at block 99. For instance, a transistor may saturate in response to a threshold signal from the current transformer in such a manner as to inhibit the timer circuit. That is, the timer will cease applying the cycles of blocks 94 and 96 to the ignited lamp. Subsequently, the lamp will be powered at block 100 according to normal ionization protocol appropriate for an ignited, thermionic stage of operation. Thereafter, the timer cycles of block 94 and 96 will only resume should a power interruption be detected at block 102. For instance, a measurement indicating inadequate current draw at the HID lamp may reinitiate the application of intermittent power at block 94.

Of note, the intermittent feature of block 96 further combats glow phase phenomena in that the lamp is permitted to cool in between applications of ionization pulses. By way of review, a glow phase state is often accompanied with sputtering that increases opacity and otherwise reduces lamp life and overall performance. Current detected at block 98 during glow phase will not quite register as having achieved sufficient current draw to trigger the inhibit thresholds. Consequently, the timing cycles of an ignition application will not cease.

Thus, absent the provision of block 96, a driver circuit of a prior art operation may continue to provide continuous ionizing potential to the lamp, prolonging and fueling glow ionizing potential and sputtering. Instead, the intermittent ionizing potential cycling of block 96 permits the lamp to cool to a lower state that is not associated with the sputtering complications. A next application of power at block 94 may then be sufficient to bump the ballast/lamp up to the ignited state at block 98 in such a manner as to quickly transition beyond the glow phase condition.

In addition to minimizing glow phase and it associated effects, the present invention as described herein provides for energizing of HID lamps. More particularly, the intermittent nature of the ballast output enables a lamp to achieve an ignited state in a manner that obviates the need for a large voltage spike. This feature mitigates loss of material from electrodes, the occurrence of tube blackening and the shortening of lamp life. Consequently, the efficiency of the lamp is improved over time, and lamp operation requires less applied power. Timing protocol of the invention additionally ensures compatibility with conventional RMS and other equipment ratings, reducing requirements for high-voltage wiring and sockets.

The invention furthermore provides an internal mechanism for sensing the operating state of the lamp, facilitating the above-discussed benefits. Namely, a mechanism for sensing various states of the lamp at its stages of ignition is provided. For instance, a sensor may detect a voltage, current, radiated energy or some optical occurrence indicating the state of the lamp. In response to such detection, the control circuitry inhibits the cycling circuitry if the lamp has reached it ignited state or may repeat ionization cycles if it has not. As a result, the lamp transitions from ignition to normal steady state operation in a manner that minimizes tube blackening while maximizing lamp efficiency and longevity.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For instance, while the exemplary ionization cycle 42 of FIG. 2A includes a single on and off portion, another cycle may incorporate multiple such portions. Morever, the waveforms of such on portions may vary in shape, magnitude, frequency and/or duration.

Furthermore, one skilled in the art should appreciate that any of the embodiments discussed above are compatible with all known ballast applications and may further be optimized to realize even greater efficiencies. The invention in its broader aspects is, therefore, not limited to the specific details, representative apparatus and method, and illustrative examples shown and described. Accordingly, departures may be made from such details without departing from the spirit or scope of the general inventive concept.Having described the invention,

What is claimed is:

1. A method of operating a ballast to energize a gas discharge lamp to an ignited state comprising:
   operating the ballast to supply an ionizing potential of a square wave through the lamp; and
   interrupting the ionizing potential for a period that exceeds a remainder of an ionization cycle at least once before the lamp reaches the ignited state, wherein the ionization potential is delivered to the lamp in the ionization cycle.

2. The method according to claim 1, further comprising interrupting the ionizing potential in an end of the ionization cycle.

3. The method according to claim 1, further comprising interposing an interruption in a beginning portion of the ionization cycle.

4. The method according to claim 1, further comprising interposing an interruption ion a middle portion of the ionization cycle.

5. The method of claim 1, further comprising inhibiting the ionizing potential in response to sensing an ionization occurrence.

6. The method according to claim 5, further comprising sensing the ionization occurrence using an instrument selected from a group consisting of at least one of: a transistor, an inductor, a transformer, a photosensor, an antenna, a thermistor, a chemical reaction and a motion sensor.

7. The method according to claim 5, wherein the ionization occurrence is selected from a group consisting of at least one of: a voltage condition, a chemical reaction, a vibrational condition, a current condition, a radiation condition, an optical condition and an ignited lamp state.

8. The method according to claim 1, wherein the remainder of the ionization cycle is nine times shorter than an interrupted portion of the ionization cycle.

9. The method according to claim 1, further comprising supplying an ionizing potential to the ballast timed to coincide with at least a portion of an off period of the ionization cycle.

10. The method according to claim 1, further comprising including at least two on periods within the ionization cycle.

11. The method according to claim 10, wherein the two on periods have different waveform characteristics selected from a group consisting of at least one of: amplitude, shape, frequency, and duration.

12. The method of claim 1, wherein interrupting the ionizing potential further includes interrupting the ionizing potential only when the lamp fails to reach the ignited state.

13. A method of operating a ballast to energize a high intensity discharge lamp to an ignited state comprising applying an ionizing potential of a square wave through the lamp from the ballast, the ionizing potential being applied in an intermittent ionization cycle, wherein the ionizing potential is interrupted for a period that exceeds a remainder of the intermittent ionization cycle.

14. The method of claim 13, further comprising sensing an ionization occurrence.

15. The method of claim 14, further comprising inhibiting the ionizing potential in response to the sensed ionization occurrence.

16. The method according to claim 14, wherein the ionization occurrence is selected from a group consisting of at least one of: a voltage condition, a chemical reaction, a vibrational condition, a current condition, a radiation condition, an optical condition and an ignited lamp state.

17. An apparatus comprising:
   a ballast for supplying an ionizing potential of a square wave during an ionization cycle through a gas discharge lamp to energize it to an ignited state; and
   control circuitry integral within the ballast being operable to interrupt the ionizing potential at least once prior to the ignited state being achieved, wherein the ionizing potential is interrupted for a period that exceeds a remainder of the ionization cycle.

18. The apparatus of claim 17, wherein the control circuitry senses an ionization occurrence.

19. The apparatus of claim 18, wherein the control circuitry inhibits the ionizing potential in response to the sensed ionization occurrence.

20. The apparatus of claim 18, wherein the ionization occurrence is selected from a group consisting of at least one of: a voltage condition, a chemical reaction, a vibrational condition, a current condition, a radiation condition, an optical condition and an ignited lamp state.

21. The apparatus of claim 17, wherein the remainder of the ionization cycle is nine times shorter than an interrupted portion of the ionization cycle.

22. The apparatus of claim 17, wherein the control circuitry supplies a secondary ionizing potential to the ballast timed to coincide with at least a portion of an off period.

23. The apparatus of claim 17, wherein the ionization cycle includes two on periods.

24. The apparatus of claim 23, wherein the two on periods have different waveform characteristics selected from a group consisting of at least one of: amplitude, shape, frequency and duration.

25. The apparatus of claim 17, wherein the ionizing potential is interrupted only if the lamp falls to reach the ignited state.

26. An apparatus comprising:
   a ballast having control circuitry configured to supply an ionizing potential of a square wave in an intermittent ionization cycle through a high intensity discharge lamp to energize the high intensity discharge lamp to an ignited state, wherein the ionizing potential is interrupted for a period that exceeds a remainder of the intermittent ionization cycle.

27. The apparatus of claim 26, wherein the control circuitry inhibits the ionizing potential in response to sensing an ionization occurrence.

28. The apparatus of claim 27, wherein the ionization occurrence is selected from a group consisting of at least one of: a voltage condition, a chemical reaction, a vibrational condition, a current condition, a radiation condition, an optical condition and an ignited lamp state.

29. The apparatus of claim 26, wherein the control circuitry supplies a secondary ionizing potential to the ballast timed to coincide with at least a portion of an off period of the intermittent ionization cycle.

30. The apparatus of claim 26, wherein the intermittent ionization cycle includes two on periods.

31. The apparatus of claim 30, wherein the two on periods have different waveform characteristics selected from a group consisting of at least one of: shape, frequency and duration.

* * * * *

UNITED STATES PATENT AND TRADEMARK OFFICE
CERTIFICATE OF CORRECTION

PATENT NO.    : 6,794,826 B2
DATED         : September 21, 2004
INVENTOR(S)   : Denny D. Beasley It is certified that error appears in the above-identified patent and that said Letters Patent is hereby corrected as shown below:

Column 6,
Line 23, "following RMS/V equation:" should read -- following RMS/$V_{eff}$ equation: --
Line 57, "rating maybe accommodated by" should read -- rating may be accommodated by --.

Column 8,
Line 31, "FIG. 1 maybe integrated" should read -- FIG. 1 may be integrated --

Column 11,
Line 44, "an interruption ion a middle portion" should read -- an interruption in a middle portion --

Column 12,
Line 57, "if the lamp falls to reach" should read -- if the the lamp fails to reach --

Signed and Sealed this

Twelfth Day of April, 2005

JON W. DUDAS
*Director of the United States Patent and Trademark Office*